United States Patent [19]

Gamal et al.

[11] Patent Number: 5,754,826
[45] Date of Patent: May 19, 1998

[54] CAD AND SIMULATION SYSTEM FOR TARGETING IC DESIGNS TO MULTIPLE FABRICATION PROCESSES

[75] Inventors: Abbas El Gamal; David P. Marple, both of Palo Alto; Justin M. Reyneri, Los Altos, all of Calif.

[73] Assignee: Synopsys, Inc., Mountain View, Calif.

[21] Appl. No.: 511,172

[22] Filed: Aug. 4, 1995

[51] Int. Cl.$^6$ ................................................ H01L 21/70
[52] U.S. Cl. ................................... 395/500; 364/490
[58] Field of Search ................................. 364/488, 489, 364/490, 491, 578; 395/500

[56] References Cited

U.S. PATENT DOCUMENTS

| | | | |
|---|---|---|---|
| 4,584,653 | 4/1986 | Chih et al. | 364/491 |
| 4,686,629 | 8/1987 | Noto et al. | 365/491 |
| 4,697,241 | 9/1987 | Lavi | 364/488 |
| 4,700,317 | 10/1987 | Watanabe et al. | 364/488 |
| 4,701,860 | 10/1987 | Mader | 364/490 |
| 4,713,773 | 12/1987 | Cooper et al. | 364/491 |
| 4,752,887 | 6/1988 | Kuwahara | 364/491 |
| 5,351,197 | 9/1994 | Upton et al. | 364/491 |
| 5,500,805 | 3/1996 | Lee et al. | 364/491 |
| 5,563,801 | 10/1996 | Lee et al. | 364/491 |

OTHER PUBLICATIONS

B. Fawcett, "Tools to speed FPGA development", IEEE Spectrum, Nov. 1994, pp. 88–94.
R. Braham, "Application Software", IEEE Spectrum, Jan. 1995, pp. 66–70.
G. Skinner, "Progress toward a Computerized Mask Shop", Solid State Technology, May 1988, pp. 131–134.
E. Murphy, "Design Automation", IEEE Spectrum, Jan. 1988, pp. 34–37.
A. de Geus, "Logic synthesis speeds ASIC design", IEEE Spectrum, Aug. 1989, pp. 27–31.

*Primary Examiner*—Kevin J. Teska
*Assistant Examiner*—Dan Fiul
*Attorney, Agent, or Firm*—Skjerven, Morrill, MacPherson, Franklin & Friel; Brian D. Ogonowsky

[57] ABSTRACT

Using the present invention, only a single design and development process needs to be conducted for ICs fabricated using a number of different fabrication processes. In one embodiment of this process, the IC is first designed on a CAD system using a generic Cell Based Architecture (CBA) library. This generic CBA library represents several libraries for different process technologies. The resulting generic design is then simulated and verified using best and worst case timing delays and other parameters which are derived from a combination of the various technologies. Hence, only one design need be created and simulated. Generic design rule and parasitic parameters are then used to optimize the placement and routing of the generic design. The post-layout generic design is then simulated and verified using performance characteristics determined by a combination of the technologies. The accepted, generic post-layout design is then ported for each intended fabrication process to create the mask patterns associated with each fabrication process.

18 Claims, 6 Drawing Sheets

FIG. 6 foundry specific I/O macros

CAD AND SIMULATION SYSTEM FOR TARGETING IC DESIGNS TO MULTIPLE FABRICATION PROCESSES

FIELD OF THE INVENTION

This invention relates to the computer aided design (CAD) of integrated circuits, and more particularly to the design of an integrated circuit which is intended to be manufactured by a number of foundries employing different fabrication processes.

BACKGROUND OF THE INVENTION

Complex integrated circuits (ICs) are typically designed using a CAD system. The CAD system allows the user to design the IC using a process specific macro cell library consisting of predesigned process specific circuit building blocks, then simulate and verify the performance of the designed IC, and ultimately generate the masks for fabricating the IC. If the IC were to be manufactured under a different fabrication process, such as one using masks with different interconnect widths and pitches, or transistors with different electrical characteristics, among other changed parameters, the resulting IC may not function reliably. Even if it functions reliably, performance may be significantly different since the devices and interconnections would have different electrical characteristics. The different performance could alter the intended IC function and, as a result, the designer must resimulate and perhaps redesign the IC for each process technology to maintain the desired function and performance. Thus, a designer of an IC who wishes to have the IC manufactured by several foundries, each employing a different fabrication process, must undergo a separate design development cycle for each fabrication process.

The above scenario is very common, since many companies that market ICs in high demand use a number of wafer foundries in order to supply enough ICs and to reduce the risk of an IC supply shortage due to manufacturing problems at a particular foundry.

Normally the IC fabrication process of a given foundry differs from that of most other foundries. For example, a more advanced fabrication facility can fabricate an IC with interconnections with narrower line widths and smaller pitches and active devices (transistors) with faster switching speeds and smaller geometries than a less advanced wafer fabrication facility. As a result, the IC manufactured at the former facility would cost less and perform better than the latter facility.

Therefore, the IC must be designed in view of the intended fabrication processes to ensure that the ICs manufactured by the various foundries meet the intended performance and cost specifications of the IC.

Application specific ICs (ASICs), which include mask programmable gate arrays, standard cells, and programmable logic, are among the most popular type of ICs for implementing digital systems. In a mask programmable gate array, metal and contact masks are customized to interconnect devices on a partially fabricated IC termed a master array or base array. A master array consists of an array of basic cells, each comprising a number of devices.

Figure 1:
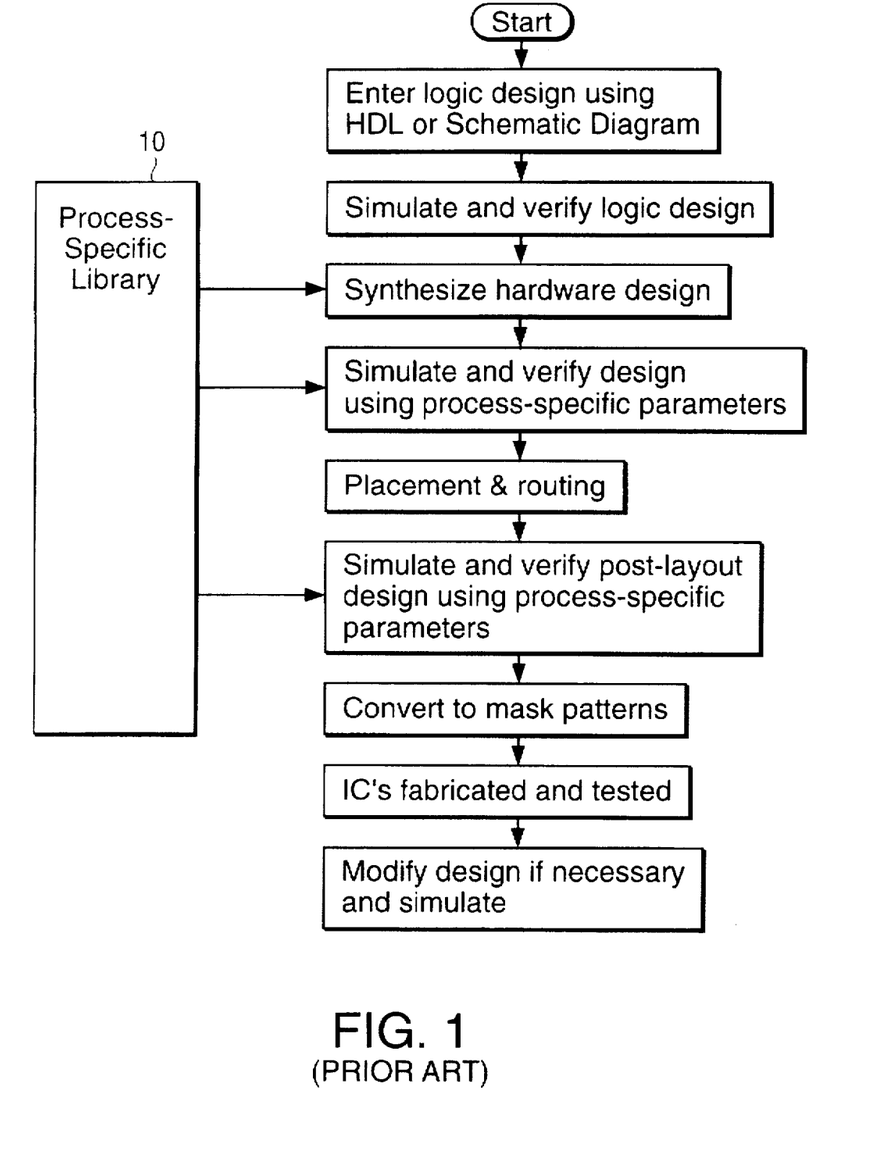
FIG. 1 is a flowchart illustrating a conventional IC development process.

FIG. 1 illustrates a basic flow chart for designing an ASIC.

In a first step, the designer identifies the primary functions needed for the IC to attain the desired behavior. These primary, high level functions are often specified in a CAD system using a well known hardware description language (HDL) such as Verilog HDL. The designer simulates and verifies the behavior of the IC high level design, encapsulated in HDL, using a simulator such as Cadence's Verilog™. The designer then creates the detailed logic for the design using a CAD program that synthesizes the logic from the HDL description using a technology or process specific library. Synopsys's Design Compiler™ is an example of such a synthesis tool. Referring to FIG. 1, the library 10 consists of predefined macrocells and design rules for a specific fabrication process. The library 10 is usually provided by the ASIC vendor, and typically includes macrocells such as logic gates, sequential logic functions, adders, counters, multiplexers, and latches among other standard functions.

Alternatively, the designer can specify the detailed logic directly as Boolean equations or as logic schematics using a schematic capture program.

In addition to using predefined macrocells from a process specific library, the designer may also use custom patterned blocks, which may be "manually" crafted by a mask designer. Examples of such custom blocks include RAMs, ROMs, microcontrollers, and A/D converters. Netlist (symbolic) interconnections between the macrocells and any custom blocks, as well as power, ground, and primary input/output (I/O) interconnections, are often automatically generated using a logic synthesis program.

In a next step, the designer verifies the IC design at the logical level, using the functions and the timing characteristics supplied in the macrocell library, to determine whether the design is functionally correct and meets the desired timing requirements. This is typically performed using a logic simulation tool, such as Verilog, and other timing analysis tools. Such tools take into account the estimated capacitive loads of physical (mask) interconnections, macrocell delay times, sequential macrocell set-up and hold times and other factors important to achieving an accurate simulation of the IC function and performance. Since capacitive loading due to the physical interconnections is not known at this stage, estimates of the loading based on fanout and design size among other factors are used.

After logic simulation and timing analysis are successfully completed, the design logic macrocells are placed on a master array and the macrocells interconnections are physically routed according to the design netlist. Macrocell placement and routing are typically automated using a placement and route tool such as Gate Ensemble (TM) from Cadence. After placement and routing, or layout to use the common term, are complete, accurate interconnect parasitics for all nets are extracted from the physical patterns and the resulting delays per net are back annotated to the timing verification tools. The designer then performs post-layout timing verification. If any timing violations are detected, the netlist is modified to remove such violations and placement and routing are incrementally performed on the modified netlist. This process is called an Engineering Change Order (ECO). If no timing violations are found in the post-layout verification, mask layers are generated for the design using special software.

In the next step, the foundry or an external mask supplier uses the generated pattern data to ultimately create wafer masks for the manufacture of the IC. The foundry then uses the resulting masks to fabricate the ICs. Once fabricated, either the foundry or the customer tests the ICs. If the test results are unsatisfactory, the design is modified, and all or a portion of the above process is repeated.

Since an IC design depends on the specific process of the target foundry, the cost of developing a design for more than one foundry can be prohibitive, since significant reengineering cost and time are incurred for each new target process.

U.S. Pat. No. 4,584,653, to Fujitsu, describes a structure and method for designing and manufacturing a gate array IC using macrocells. Additional information regarding such a standard process can be obtained from that patent, incorporated herein by reference.

One way to address the engineering costs of designing an IC for more than one fabrication process is to design the IC once only using the least common denominator design rules and electrical parameters. This is done using a macrocell library designed using worst case design rules and electrical parameters across the targeted fabrication processes and using worst case parasitics to estimate delays due to physical interconnections. These worst case design rules would be chosen so that the design does not violate the design rules of any of the target processes. In addition, the designer would design his/her IC using the worst case timing and routing parasitics across the target processes. The timing and parasitics would be chosen so that the IC is guaranteed to perform when processed using any of the target processes. Even so, the designer must still simulate the IC design using models for each target process to ensure that the resulting IC will meet the design specifications under typical, worst or best case conditions. However, the same mask patterns, perhaps with some minor modifications, could be used for all target processes. The disadvantage of this method is that the resulting die size is larger and consequently costlier to manufacture than when using a method where the IC is specifically engineered for one process. Additionally, the die size reductions and possible cost savings with some target processes over another would not be realized.

The motivation for the present invention is to address the above problems by developing an IC design methodology where the IC can be manufactured under a number of different fabrication processes, where the designer does not perform a separate simulation and development cycle for each process, and where the IC die size is optimized for each process. This methodology will reduce the product development and manufacturing costs as well as get the product to market faster.

SUMMARY

Using the present invention, a designer designs an IC only once and then automatically transforms the design for manufacture to one or more different fabrication processes. The process set will be referred to as a club and a process in the club will be referred to as a member or target. Processes belonging to the same club will typically be similar in design rules and electrical characteristics. In one embodiment of this invention, the IC is first designed on a CAD system using a generic library for a Cell Based Array (CBA) architecture. Suitable CBA architectures are described in U.S. Pat. Nos. 5,289,021 and 5,055,716, assigned to the present assignee and incorporated herein by reference. The generic library is composed of macrocells which are laid out with generic design rules, as described below. The macrocells in the generic library are also laid out in each of a set of process specific libraries according to the process design rules.

A process design rule is a specification of the minimum dimension or spacing for a single layer (mask pattern) or among more than one layer. For example, the minimum width of metal for some process is 1.2 µm, and the minimum spacing of polysilicon to diffusion is 1.0 µm. Normally every process requires a complete set of design rules called the process design rules. When process design rules are obeyed for an entire design, the design can be manufactured with high yield.

A generic design rule is a process design rule except with generic distances, such as 1 unit. Moreover generic design rules are not qualified by distance, such as spacing of thin or fat metal or spacing of short or long metal. For example, the minimum width of all metal (thin or fat, short or long) is 1, and the minimum spacing of polysilicon to diffusion is 1. The same distance can be applied to all generic design rules since all that is actually important is the topology or relative layer position of the rule. A set of generic design rules is used for the layout of generic macrocells, where the set includes one of every rule type among all the process design rules. Note that the generic design rules may include more rules than any club process design rules, resulting in a type of least common denominator topology for any generic layout. For example, one process may require vias to be spaced away from contacts but another process may allow vias to stack on top of contacts. The generic design rule set for both processes would require vias to be spaced away from contacts.

To target an IC to a club, the designer first verifies the design using the generic library. The designer simulates and analyzes the design using best and worst case timing delays and other parameters which are determined by a combination of the processes in the club. Hence, the designer creates and simulates his/her design only once.

The designer then uses an automated placement and routing tool, such as Gate Ensemble™ from Cadence, and the generic design rules (the same as those used in the layout of the macrocells in the generic library) to determine an optimized generic layout for the design. The designer again simulates and verifies his/her design using the best and worst case timing delays and other parameters which are determined by a combination of the member processes.

The generic layout of the design is then converted (or ported) to each member in the club to arrive at a process specific layout using a software program that hierarchically transforms the generic layout to the process specific layout, substituting process specific versions of each macrocell and each interconnection while maintaining the same relative positions of the macrocells and the interconnections.

Accordingly, the present invention uses a single development cycle to design, layout, route and simulate the IC as a generic circuit, then transforms the generic circuit into a number of process specific circuit designs. The transformed process specific design will utilize the particular properties of the target process to minimize the die size of the IC, which minimizes cost and improves performance.

DETAILED DESCRIPTION OF THE PREFERRED EMBODIMENTS

In the preferred embodiment of the invention, the IC design is to be implemented in a mask programmable gate array such as described in U.S. Pat. No. 5,289,021, previously mentioned.

Figure 2:
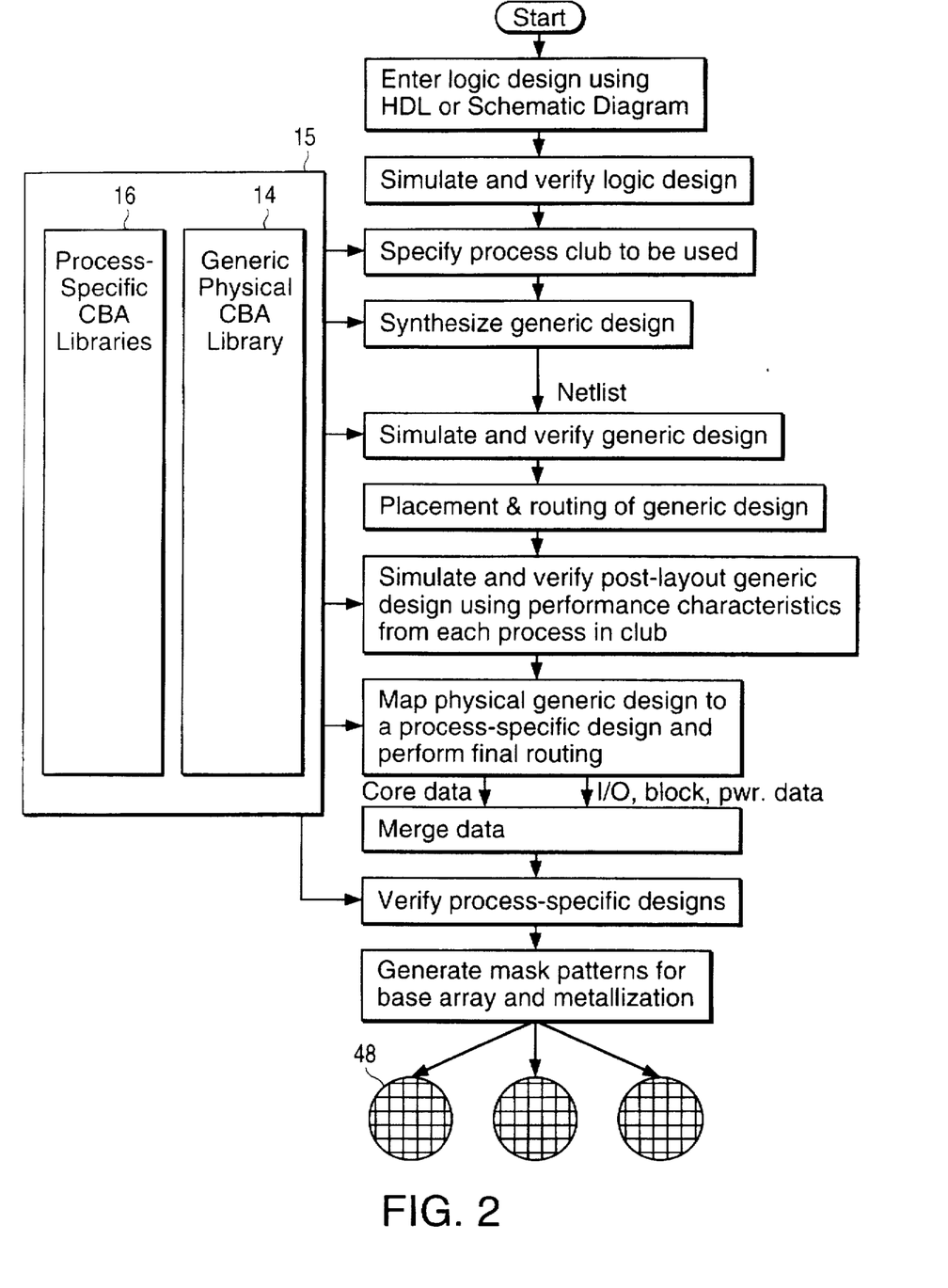
FIG. 2 is a flowchart illustrating a preferred embodiment of the invention.

FIG. 2 is a flowchart illustrating the basic steps used in one embodiment of the invention for designing and simulating a generic circuit and then automatically converting the generic design to a number of process specific designs to be fabricated using the target processes. In the preferred embodiment, the IC designer is provided a package consisting of the following data and software elements:

1. Process specific CBA libraries with a common set of macrocells;

2. A generic physical CBA library with the same set of macrocells but implemented with generic design rules;

3. A set of generic design rules and parameters needed for placing and routing the generic macrocells;

4. Conversion software for transforming the generic physical design to a process specific physical design, enabling the generic design to be efficiently fabricated with a target process; and 5. Delay parameters and back-annotation software for computation of the performance delays over the set of target processes, enabling the generic design to be simulated both before and after placement and routing to determine whether the generic design would satisfactorily operate when fabricated using the target processes.

The software can run on a variety of computer platforms, such as workstations from Hewlett-Packard, Sun Microsystems, IBM, Digital Equipment Corporation, and Silicon Graphics, or any suitable personal computer. The medium on which the software is provided may be a microdiskette, a floppy disk, or any other medium. As described herein, the above software is used in conjunction with existing commercially available software packages to carry out the full method described herein.

Referring to FIG. 2, a generic library 14 is provided to the user. This is the library that the designer uses to design the generic circuit. The generic library 14 allows the designer to design and test a single generic circuit and allows the automatic conversion of the single design to a number of process specific designs. The generic library 14 is created using a set of simple design rules which are compatible with design rules of each of the target processes.

The set of libraries 15 provided to the user also includes process specific libraries 16. Creating process specific libraries (i.e., interconnections between components to form macrocells) for a particular gate array is well known. The creation of a process specific gate array is straightforward since only the implementation of a single basic cell (incorporating various active components) must be developed and then repeated to create the array. The design of macrocells is also facilitated using a CBA. The method described herein, however, may also be applied to non-CBA gate arrays. These process specific libraries contain macrocells and their performance characteristics for that specific process. Examples of macrocells include combinational logic gates, flip-flops, latches, adders, counters, multipliers, multiplexers, comparators and other basic building blocks of digital logic circuits. The interconnections of the various base array devices to form the macrocell are dictated by the library. Custom macrocells or blocks (i.e., those not included in the library) may also be designed by customized interconnections of devices in the base array.

Figure 3:
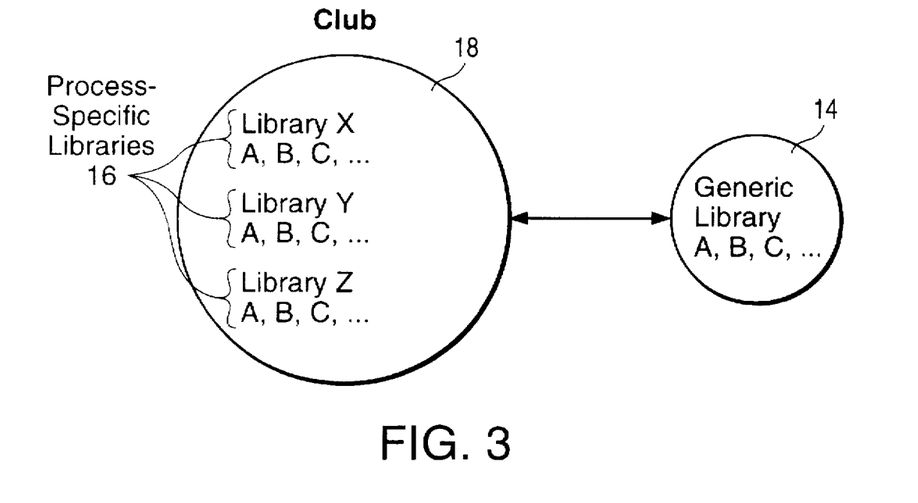
FIG. 3 illustrates how each macrocell in the generic library used by the designer has a corresponding process specific macrocell among all club members.

As shown in FIG. 3, a generic library 14 for a CBA contains a number of macrocells (A, B, C, . . . ), each of which is also available in each club member library, where a club member library is actually a process specific library. The members of the club 18 are chosen based on similar timing characteristics, e.g. macrocells with similar delays and interconnect parasitics with similar resistance and capacitance. In order to obtain the full benefits of the present invention, processes which are not sufficiently similar should not be a member of the club even though a corresponding macrocell library may be available. Assuming that an IC to be designed is to be fabricated using three different processes, then at least three eligible members must be identified before a generic library representing the club is composed. In FIG. 3, three such processes are indicated as library X, library Y, and library Z. The macrocells identified with the same letter A, B, or C in libraries X, Y and Z perform the same logical function (e.g., add, count) and are grouped in the same club 18. The process specific macrocells and the generic macrocells have the same input/output terminal locations relative to their respective routing grids.

Create and Verify High Level Design

Referring back to FIG. 2, a designer initially implements his/her intended digital circuit by identifying the logic functions needed to meet the design specification. The designer usually describes the logic functions at a high level using conventional HDL or mathematical equations, or at a digital gate level using a schematic diagram, or at a mixed level using some combination of these descriptions. The schematic diagram description may use a conventional logic symbol library.

This logic description is then simulated mathematically (e.g., behaviorally) if it is high level, or logically if it is gate level, to verify that it performs the desired logical functions.

Describing the behavior of a digital design using HDL (or other description) then simulating the behavior is well known to those skilled in the art. A discussion of certain logic synthesis tools and their availability are described in the article "Logic Synthesis Speeds ASIC Design," IEEE Spectrum, pages 27–31, August 1989, incorporated herein by reference.

Synthesize and Verify Generic Circuit Design

If the design was entered as HDL or other high level logic description, the designer then selects a process club, where the club (e.g., club 18 in FIG. 3) includes the processes which he/she wants to target for fabricating the IC design.

The designer then synthesizes the verified high level design to create a logic circuit composed of primary Boolean gates. The gate logic is then optimized for delay or area while being mapped to the available set of macrocells in the generic library. The final result of the synthesis/optimization process is a digital circuit (or netlist) containing macrocell instances and interconnections between the instances. The circuit also includes the primary I/Os (input/outputs) that serve to interface the circuit to devices external to the IC.

Synthesizing and optimizing the design using the generic library 14 is performed in a manner similar to that used for synthesizing and optimizing a design using a process specific library, as is done conventionally. The designer uses the same synthesis/optimization software when using the generic library. Examples of commercial synthesis/optimization software include Design Compiler™ from Synopsys, and Autologic™ from Mentor Graphics. The designer supplies any required instructions to direct the software in creating the generic digital circuit. The user may also "manually" specify some portion of the generic circuit using macrocells in the generic library or using custom made or compiled blocks.

The synthesized generic circuit is then simulated with a test pattern of input signals at the intended clock rate to determine whether the generic circuit performs within the objective specification for the design. Estimated capacitive loading based on fanouts, user supplied capacitive loading, input transition delays, and other parameters which affect performance are taken into account during this simulation. The loading and macrocell drive strength may be altered to adjust the performance of the circuit. The altered circuit is again simulated to verify the new performance. The general methods for performing such simulation and verification are well known, and only those significant differences between simulating for a single process technology and simulating a generic circuit will be identified.

In the preferred embodiment, the designer simulates the synthesized generic digital circuit by running a simulation program that uses back annotated timing data in SDF (Standard Delay Format). The SDF data is produced by a back-annotation program that computes the macrocell timing arcs (input pin to output pin delays) using the performance characteristics from the process specific libraries 16. The back-annotation program selects the maximum delay, the minimum delay, and the average delay for each timing arc over all the processes in the club. The simulation program thus uses the back-annotated data to emulate the overall digital circuit under maximum, minimum, or average delay conditions. For all conditions, these delays constitute the estimated timing of the circuit before placement and routing. Once the designer verifies and adjusts the generic circuit with a logic simulator, the resulting final (fabricated) circuit will thus be assured to operate with the minimum and maximum delays, and the simulation will provide the designer with an indication of the average performance of the final circuit.

Perform Placement & Routing on the Generic Circuit

Figure 4A:
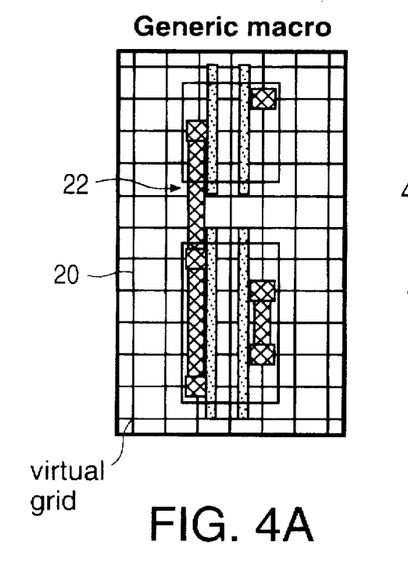
FIG. 4A illustrates a generic macrocell layout whose metallization routing aligns on a generic routing grid.
Figure 5A:
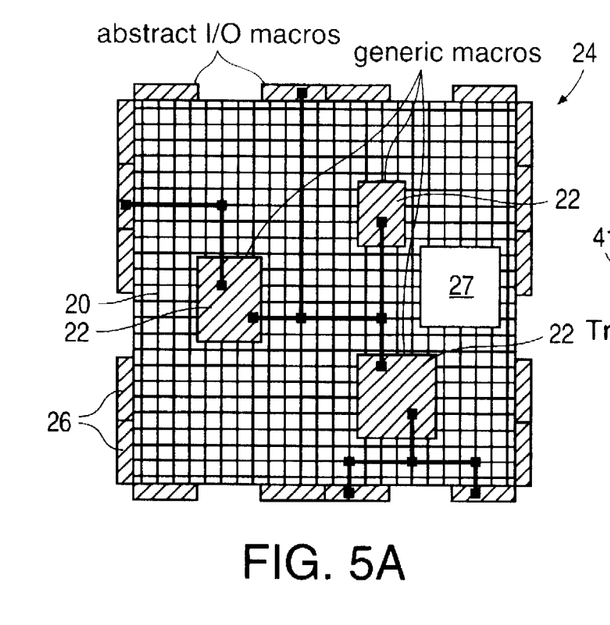
FIG. 5A illustrates a generic CBA core showing interconnected generic macrocells after an automatic placement and routing step.

Generic placement and routing design rules are then used to automatically place and route the generic digital circuit. In the prior art, one places and routes process specific macrocells on a process specific base array. In the case of CBA, the routing grid is defined by the process specific base cell alignment grid. The base cell grid is the grid used to align the metal wires and contacts defining the macrocells. When placing and routing generic macrocells, a generic base array must be used. The virtual routing grid 20 for the generic base array is defined by the generic base cell alignment grid, as shown in FIGS. 4A and 5A. The generic base cell alignment grid is chosen so that generic design rules can be applied for automatic placement and routing tools. FIGS. 4A and 5A also show a generic macrocell 22 superimposed on the generic base cell grid.

One automatic placement and routing program which may be used is the commercially available Gate Ensemble™ program from Cadence, Inc., of Santa Clara, Calif. In the preferred embodiment, such a program inputs the generic design rules, a description of the generic CBA library and base array, and the netlist description of the digital circuit before performing automatic placement and routing. This program attempts to optimize the placement and routing by creating only legal placements and physical connections while minimizing interconnect parasitics.

The generic base array 24 (FIG. 5A) used for placement and routing of the generic circuit consists of a conventional CBA core region of compute and drive base cells (placement sites) surrounded by a ring of abstract I/O base cells (which form abstract I/O macrocells 26). U.S. Pat. No. 5,289,021 describes such an array of base cells having compute and drive sections. Like conventional CBAs, the compute/drive base cells represent physical base layers, and the compute/drive sites are used to place CBA based macrocells and RAMs. Unlike conventional base arrays, the abstract I/O base cells are fictitious and have no base layer representation. The I/O sites abut directly with the CBA region and serve simply as place holders for the digital circuit's I/O macrocells. The placement of abstract I/O macrocells 26 at these I/O sites represents only a relative position or order of the I/O macrocells around the CBA region, as will be shown later. The routing to the abstract I/O macrocell pins completes the I/O routing to the CBA region only. The complete I/O routing is finished after transformation of the generic placement and routing to process specific placement and routing.

The above abstraction of I/O macrocell 26 placement and routing is used since the size of I/O base cells does not scale in the same way as CBA base cells when comparing one process implementation to another. The size and pitch of I/O base cells are often determined by the minimum pitch of bonding pads, which is normally specific to each process or foundry. In addition, the I/O macrocell device level circuits must be specially designed for each process in a way that has little to do with the CBA base cells. For example, I/O circuits have special ESD (electrostatic discharge) devices and output buffers which must be engineered specifically for each process. For these reasons, the ultimate size and pitch of the process specific CBA region after transformation could differ significantly from the surrounding process specific I/O array.

In addition to abstract I/O base cells, the generic base array 24 can also have abstract custom block base cells 27 which serve as placement sites for abstract custom blocks in the design. A custom block is a dedicated circuit that uses custom patterns for all mask layers, including base layers. Examples of custom blocks include RAMs, ROMs, multipliers, and analog circuits. The routing of abstract custom block pins in the generic CBA region completes the block routing within the CBA region only. The complete routing to the real (process specific) custom block is finished after transformation of the placed and routed CBA region.

Figure 4B:
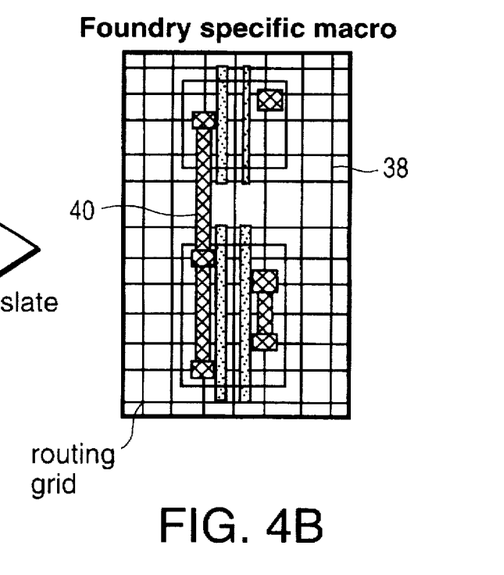
FIG. 4B illustrates a process specific macrocell layout and routing grid corresponding to the generic macrocell layout and generic routing grid of FIG. 4A.
Figure 5B:
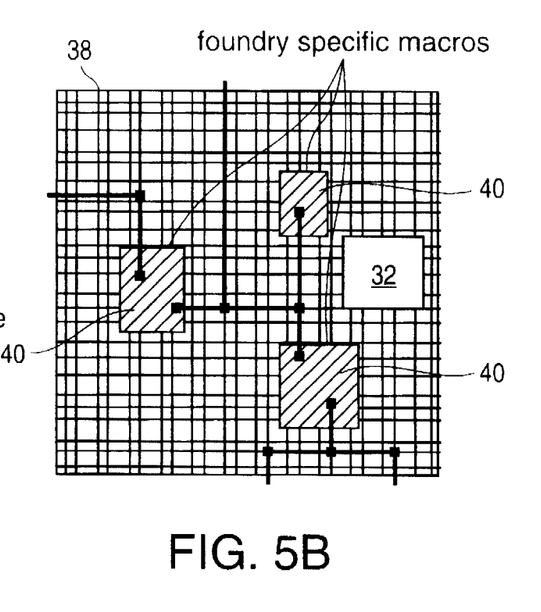
FIG. 5B illustrates the process specific CBA core corresponding to the generic core of FIG. 5A after mapping the generic design to the process specific routing grid.

The final routing of the process specific I/Os and custom blocks is done with a process specific routing grid 38, shown in FIGS. 4B and 5B. In order to make this process specific routing simple, the methodology used in the preferred embodiment ensures all interconnections to abstract I/O and abstract custom block pins are routed within the CBA core region as part of generic routing. As a result, the final routing becomes a simple task of connecting each abstract I/O or abstract custom block pin to its associated process specific I/O or custom block pin. By making this final process specific routing simple, we can limit the additional routing parasitics to the process specific I/O or custom block pins so that the resultant timing to these pins is close to the timing before the final routing.

Figure 6:
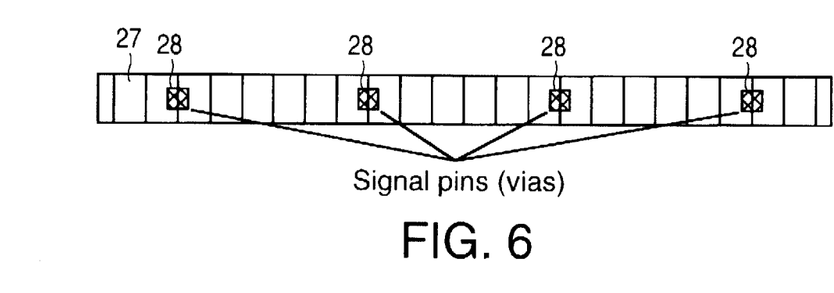
FIG. 6 illustrates several abstract I/O macrocells placed around the perimeter of the CBA core.

The abstract I/O base cells in one embodiment are only one grid square wide and one CBA core unit (e.g., two CBA rows by eight CBA columns) high. In general, the abstract I/O base cells could have other dimensions, as long as boundaries of the base cells align with the CBA power grid to avoid possible routing conflicts. Likewise, abstract I/O macrocells 26 have dimensions based on the abstract I/O base cells 27 (I/O sites), as shown in FIG. 6, and have signal pins 28 (actually vias) located on the same generic routing grid 20 as the generic CBA macrocells. The signal pins 28 are spaced at least several grids apart to allow routing flexibility to each of the pins.

Since placement tools must position I/O macrocells 26 where I/O sites are available, the generic base array 24 should have the same number of abstract I/O sites on each side of the CBA region as the process specific base array, thus simplifying the final I/O routing.

Figure 7:
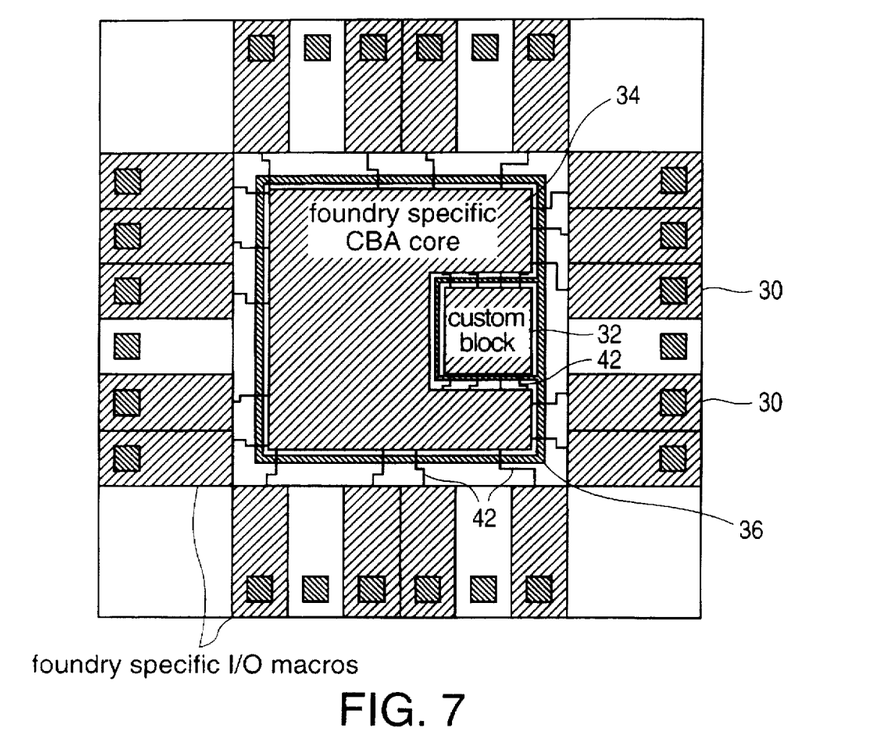
FIG. 7 illustrates a complete die with a process specific CBA core connected to a custom logic block and to process specific I/O macrocells.

FIG. 7 illustrates a process specific CBA design with utilized I/O sites (containing I/O macrocells 30) shown shaded. For most process specific base arrays, the number of CBA core unit rows or columns is more than the number required for I/O macrocells on the top/bottom or left/right of the base array. Consequently, some CBA core unit rows or columns will have no adjacent abstract I/O site utilized. Ideally, the available I/O sites should be distributed evenly along each side of the core array. The exact position of the I/O sites in the generic base array 24 is not important for the process specific I/O placement, since only the relative placement order of the abstract I/O macrocells 26 at I/O sites is preserved during process specific mapping.

In the case of custom blocks, we place abstract block cells 27 (FIG. 5A) in the generic circuit to serve as place holders for the sites (and pin locations) where the custom blocks 32 (FIGS. 5B and 7) are to be located. The size of an abstract block cell 27 must be chosen large enough to allow room, after porting the CBA region, to fit the process specific custom block 32 plus the final routing between the actual custom block pins and the abstract custom block pins plus the final power routing. FIG. 7 shows a process specific design having a custom block 32 routed to the CBA region 34 using conductors 42.

Verify Post-layout Generic Circuit In View of Specific Processes

After the generic circuit has been placed and routed, as shown in FIG. 5A, the next step involves transforming the generic macrocell 22 placements and interconnecting wires from generic routing grid 20 coordinates to the previously derived process specific routing grid 38 coordinates for each process. This transformation is needed to simulate the placed and routed process specific circuits. The specific grid coordinates for each process are a result of the process specific base array design. In the preferred embodiment, the base array is composed of interspersed compute and drive sections, where the drive sections contain transistors larger than the transistors in the compute sections. The base array will have contact points aligned with the process specific routing grid 38. Each base array design and interconnect wire size will have been optimized for a specific process. Power and clock trunk wires are sized independently of interconnect wire size, rather according to other width parameters. FIGS. 4B and 5B show a process specific routing grid 38 which is different from the generic grid 20 of FIGS. 4A and 5A, respectively, by the irregular spacing and positions of each gridline.

Given the process specific interconnect positions and widths, each interconnect resistance and capacitance (RC) is extracted using an automated tool, and their effects are used to calculate delays for each net. This is repeated for each target process. In the preferred embodiment, each net is provided a minimum and a maximum delay over all the processes in the club. In this way, post-layout verification is performed only once. Moreover, if the circuit performance among the club processes is too slow and a change at the generic layout level is needed, circuit performance verification is done only once as opposed to once for each process.

In an alternative embodiment, the RC parasitics and resultant delays for each process can be used for post-layout verification for each process.

Post-layout clock delays to all sequential elements are determined for each process for both worst case as well as best case conditions. The preferred method combines these best and worst case delays to determine the clock delays and skews for post-layout verification. The method used herein ensures the reliability of post-layout verification in terms of catching any set-up and hold time violations without being overly conservative.

The preferred method for determining the worst case clock delays, set-up and hold times is given below. Clock delay is defined as the time from the input transition of a root clock buffer to the final transition of the clock signal at the input of a sequential element (e.g., flip-flop, latch). Set-up time is defined as the minimum time that a data signal to a sequential element must be stable before the clock signal transition to the sequential element. Hold time is defined as the minimum time the data signal to a sequential element must remain after the clock signal transition to the sequential element. The worst case clock delay to each sequential element is the largest clock delay to the sequential element over all the processes in the club. This is conservative for purposes of computing clock delays, but requires an adjustment to set-up and hold times for sequential elements in order to guarantee no set-up or hold time violations are missed during simulation.

To compute the set-up and hold time adjustments for each sequential element, compute the process-introduced skew at each sequential element's clock pin, defined as follows. The process-introduced skew at a clock pin is the difference between the maximum delay to that pin, over the processes, and the minimum delay to that pin, over the processes. To adjust the set-up time for each sequential element, add the process-introduced skew for the sequential element's clock pin to the set-up time for the sequential element. To adjust hold times for sequential elements, add the maximum process-introduced skew, over all sequential elements, to the hold time for each element.

The preferred procedure for determining the best case clock delays, set-up and hold times is as follows. The clock delay to each sequential element is taken to be the best of the delays from the processes in the club. To adjust the hold time for each sequential element, add the process-introduced skew for the sequential element's clock pin to the hold time for the sequential element. To adjust set-up times for sequential elements, add the maximum process-introduced skew, over all sequential elements, to the set-up time for each element.

Using both these worst case and best case clock delays and skews, the post-layout verification is conducted for the generic circuit to catch any set-up and hold time violations without being overly conservative.

Port Verified Post-layout Generic Circuit to the Process Specific Circuits

Once the generic post-layout circuit has been verified, the generic circuit is then mapped to each specific target process. This step is referred to as porting the design.

The generic place and route data comes from a Gate Ensemble™ Design Exchange Format (DEF) file. The generic place and route data is then converted to process specific place and route data using grid mapping tables which map the generic grid 20 to the process specific grid 38. Such mapping or translation is illustrated by arrow 41 between FIGS. 4A and 4B and FIGS. 5A and 5B. For generic macrocells 22 used in the generic circuit, the process specific macrocells 40 are substituted, and each macrocell location is transformed from its generic reference location to its corresponding process specific reference location with respect to the process specific grid 38. FIG. 5B shows macrocells 40 corresponding to the generic macrocells 22 in FIG. 5A. We assume for all macrocells that the generic macrocells 22 and process specific macrocells 40 maintain the same central origin relative to their respective grids. For abstract I/O macrocells 26 and abstract custom blocks 27 in the generic circuit, no process specific versions are substituted yet, since the I/O macrocells and custom blocks will be processed at the next level, described later.

Once the CBA region is mapped to a specific process, the process specific I/O macrocells and custom blocks must be positioned then routed to the process specific CBA region 34 (FIG. 7). At this point, the process specific CBA region 34 is treated like a super macrocell that must be placed and routed to the I/O macrocells and custom blocks. The preferred embodiment is to abstract the CBA region 34 as a single block covered with metal obstructions and with metal or via pins around its perimeter, as shown in FIG. 7. The CBA region 34 pins correspond to abstract I/O macrocell 26 pins, abstract custom block 27 pins, or power pins. A special netlist is then created to connect these CBA region 34 pins to the corresponding pins on the process specific I/O macrocells 30 and custom blocks 32. Because of the one-to-one correspondence of the pins, this netlist contains only two-pin nets. This netlist is ultimately used for final I/O macrocell 30, custom block 32 and CBA region 34 signal and power routing (see FIGS. 6, 7, and 8). FIG. 7 illustrates some of these routed connections as conductors 42.

The final process specific placement and routing of the CBA region 34, I/O macrocells 30, and custom blocks 32 uses a process specific base array that is modeled similar to the generic base array used to place and route the generic circuit design. The placement of the CBA region 34, I/O macrocells 30, and custom blocks 32 are positioned on valid placement sites, so that the relative location of the CBA region 34, I/O macrocells 30, and custom blocks 32 remain the same as in the generic placement.

Figure 8:
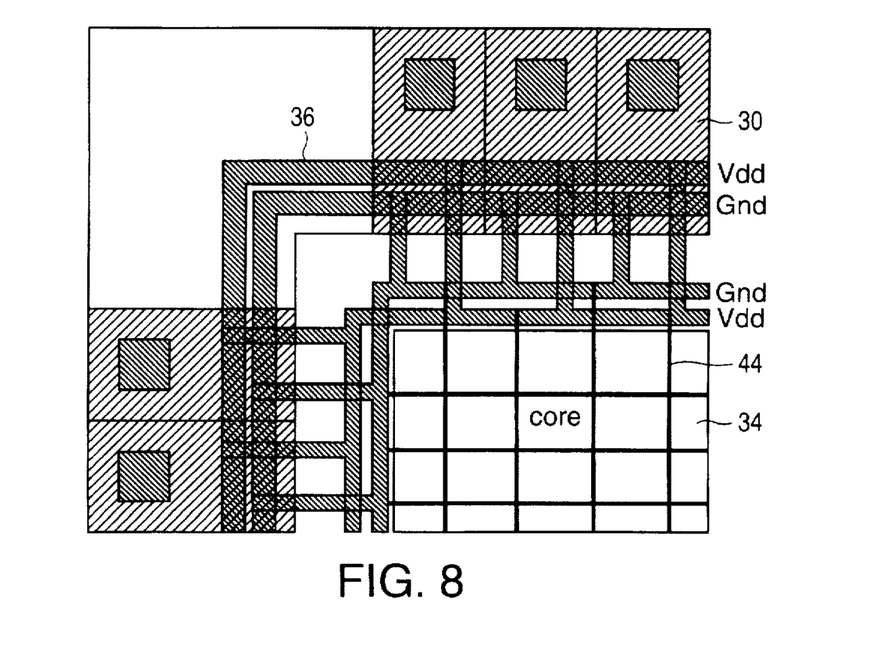
FIG. 8 illustrates a portion of an IC design showing the routing of the power and ground conductors.

After the CBA region 34, I/O macrocells 30, and custom blocks 32 are placed on the process specific base array, the final routing can be completed. First, the power routing must be completed (as illustrated in FIG. 8) by providing power busses 36 over the I/O ring and optionally around the CBA region 34 and custom blocks 32, then connecting the I/O macrocell 30, CBA region 34, and custom block 32 power pins to the power busses 36 via power conductors 44. Next, the I/O macrocell 30 and custom block signal pins are routed by conductors 42, as shown in FIG. 7, using either a general router, such as Gate Ensemble™, or a river router. This routing can be done in steps, where only one side of CBA region 34 is routed at a time and routing is limited to the immediate area. The final result should be a completely routed process specific circuit for each target process.

Verify Complete Process Specific Circuit Designs

The next step is to perform a final design rule check (DRC) and layout versus schematic (LVS) verification on each resulting process specific circuit. A common commercial tool used for both DRC and LVS verification is Dracula™ from Cadence. First, a complete GDSII file (a polygon level description) is prepared representing all base and metal mask layers of the entire circuit. The GDSII file and a design rule command file is read by Dracula™ to execute a DRC and report any errors. The method of this invention should not result in any design rule violations, so the final DRC verification should pass without intervention. Next, a SPICE file (a device level netlist description) is prepared representing all devices and interconnections of the entire circuit. The GDSII file and SPICE file are read by Dracula™ to execute a LVS check and report any errors. The method of this invention should not result in any LVS violations, so the final LVS verification should pass without intervention.

Generate Mask Patterns

This GDSII file for the complete circuit is then used by a mask pattern generator in conjunction with commercially available software to create the various masks 48 (FIG. 2) for each process.

Conclusion

As seen above, commercially available software is used whenever possible to reduce the cost of implementing this method. The present invention is primarily concerned with generating, simulating, and verifying a generic design which is intended to be fabricated using a number of different processes, and then porting this generic design to the various club processes. Hence, this disclosure focuses on the differences between the invention and the conventional methods, with the assumption that the reader is already familiar with the tools used to carry out the IC development method illustrated in FIG. 1.

The result is a number of process specific IC designs which perform identical functions but which generally make use of any advantages of a specific process to minimize the die size of the IC formed using that process. Using the present invention, the resulting die size of an IC formed using one process may differ from the die size of the same IC formed using a different process, thus saving costs where possible. A reduction in die size also generally improves the performance of the circuit.

Figure 9:
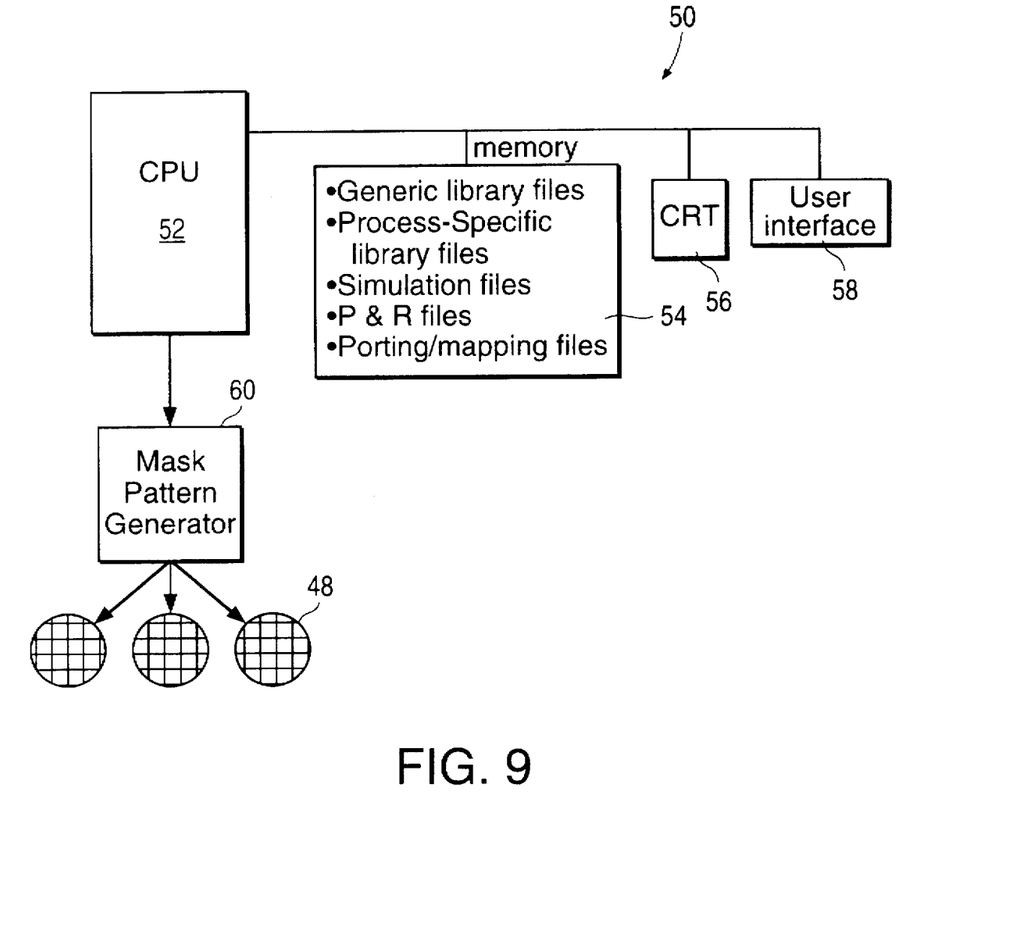
FIG. 9 is a block diagram illustrating the computing hardware used to implement one embodiment of the invention.

FIG. 9 is a simplified block diagram of a computer system 50 which may be used for performing the method of the present invention. The computer system 50 consists of a CPU 52, a memory system 54, a display device 56, which may be a Cathode Ray Tube (CRT) or Liquid Crystal Display (LCD), and a user input device 58, which may be a keyboard and mouse. The library files, simulation files, placement and routing files, and porting files are stored in the memory system 54. These files, previously described, include commercially available software programs which have been modified to perform the present invention. The library files, of course, are dependent upon the specific base array design intended to be used for the ASIC. The above invention is not limited to a gate array design but may be applied to any circuit design, as would be understood by those skilled in the art. The merged data for the process specific designs may be output on a tape or other storage medium and used by a conventional mask pattern generator 60 (along with the appropriate software) to produce the required masks 48 to manufacture the IC using a number of foundries. A set of masks 48 will be provided for each process.

13

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

We claim:

1. A method for developing an integrated circuit for being fabricated using two or more process technologies, said method comprising the steps of:

providing a generic library of generic macrocells, each of said generic macrocells representing process specific macrocells formed using two or more different process technologies;

designing a generic circuit using said generic macrocells and a generic alignment grid;

simulating said generic circuit using performance characteristics of said process specific macrocells to verify that said generic circuit, when ported to any of said process technologies, would work for its intended purpose;

porting said generic circuit to said two or more process technologies by substituting said generic macrocells in said generic circuit with process specific macrocells and substituting said generic alignment grid with a process specific alignment grid, wherein each generic macrocell location is mapped from its generic reference location on said generic alignment grid to a corresponding process specific macrocell reference location on said process specific alignment grid; and creating a set of masks for each of said processes to enable said integrated circuit to be manufactured using said two or more process technologies.

2. The method of claim 1 further comprising the step of conducting a generic macrocell placement and routing routine on said generic circuit to optimize placement of said generic macrocells and metallization routing between said generic macrocells with respect to said generic alignment grid, and wherein said step of simulating said generic circuit comprises:

simulating said generic circuit prior to said step of conducting placement and routing, and then simulating said generic circuit after said step of conducting placement and routing.

3. The method of claim 2 wherein simulating said generic circuit after said step of conducting placement and routing comprises the step of:

determining a minimum delay and a maximum delay of said generic circuit using said performance characteristics of said process specific macrocells to determine performance delays under both worst case and best case conditions.

4. The method of claim 1 wherein said generic circuit is formed, at least in part, by interconnecting elements in a gate array.

5. The method of claim 4 wherein said gate array is comprised of an array of cells, where said cells comprise compute sections and drive sections, said drive sections containing transistors which have a higher current handling capability than transistors within said compute sections.

6. The method of claim 1 wherein said step of designing a generic circuit comprises the steps of:

creating a logic design by identifying the logic functions needed to be performed by said integrated circuit;

simulating said logic design to verify its intended function; and

14 using said generic macrocells to replace said logic functions to design said generic circuit.

7. The method of claim 1 wherein said step of simulating said generic circuit comprises the steps of:

selecting a maximum delay, a minimum delay, and an average delay for process specific macrocells conforming to said generic macrocells in said generic circuit; and simulating the performance of said generic circuit using said maximum delay, said minimum delay, and said average delay to emulate the final integrated circuit under maximum, minimum, or average delay conditions.

8. The method of claim 1 further comprising the step of conducting a generic macrocell placement and routing routine on said generic circuit to optimize placement of said generic macrocells and metallization routing between said generic macrocells with respect to said generic alignment grid.

9. The method of claim 8 wherein said generic macrocells and said process specific macrocells maintain the same central origin relative to their respective alignment grids.

10. The method of claim 9 wherein said generic circuit is formed, at least in part, by interconnecting elements in a gate array.

11. The method of claim 10 wherein said generic circuit further includes a custom block which is not a portion of said gate array.

12. The method of claim 1 further comprising the step of performing a design rule check to determine if the final design of each process specific circuit violates any design rules for that process.

13. The method of claim 1 wherein said generic alignment grid corresponds to a generic metallization routing grid, and said process specific alignment grid corresponds to a process specific metallization routing grid.

14. A computer readable storage medium containing a software program for aiding in the development of an integrated circuit for being fabricated using two or more process technologies, said program comprising:

a generic library containing generic macrocells which correspond to logical functions;

a process specific library containing process specific macrocells corresponding to generic macrocells in said generic library;

a set of generic design rules and parameters for placing and routing generic macrocells on a generic alignment grid to carry out performance functions specified by a user of said software;

conversion software for transforming a generic circuit design to a particular process specific circuit design enabling the generic circuit design to be fabricated with a particular process, said generic circuit design comprising said generic macrocells located on said generic alignment grid and being interconnected to carry out desired logical functions, said process specific circuit design comprising said process specific macrocells located on a process specific alignment grid and being interconnected to carry out said desired logical functions, said conversion software substituting said generic macrocells in said generic circuit design with process specific macrocells and substituting said generic alignment grid with a process specific alignment grid, wherein each generic macrocell location is mapped from its generic reference location on said generic alignment grid to a corresponding process specific macrocell reference location on said process specific alignment grid; and performance parameters for said process specific macrocells for computation of estimated delay characteristics when said generic circuit is fabricated using said two or more process technologies, enabling the generic circuit design to be simulated and verified to determine whether the final integrated circuit will work for its intended purpose when fabricated using said two or more process technologies.

15. The computer readeable storage medium of claim 14 wherein a logic synthesis program interacts with said generic library to create a generic hardware design which carries out said performance functions specified by the user of said software.

16. The computer readeable storage medium of claim 14 further comprising a simulation program for simulating a generic circuit design after being placed and routed on said generic alignment grid to determine, at least, a worst case performance of said generic circuit design when ported to said two or more process technologies.

17. The computer readeable storage medium of claim 14 wherein said generic library and said process specific library contain macrocells formed using a cell based architecture.

18. The computer readeable storage medium of claim 17 where said cell based architecture is a gate array consisting of an array of basic cells, where each basic cell includes a compute section and a drive section, said drive section having transistors which are larger than transistors in said compute section.

* * * * *